UNITED STATES PATENT OFFICE.

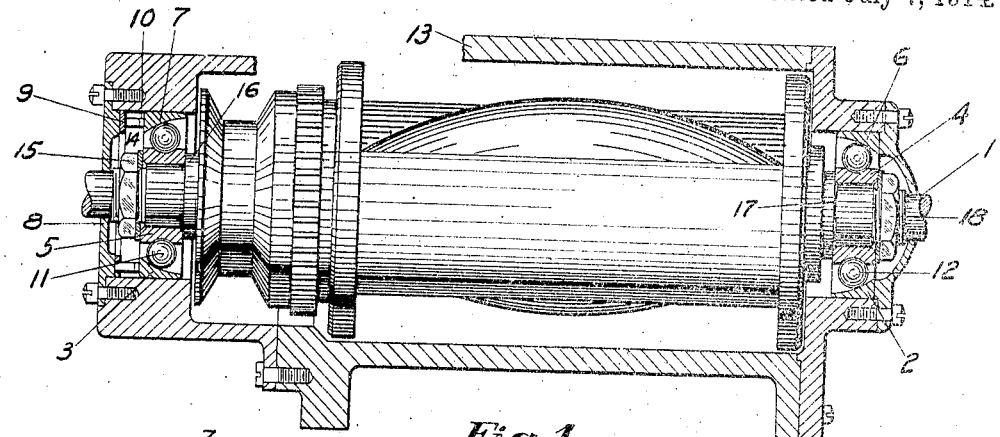

ALBERT F. ROCKWELL, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

ANTIFRICTION-BEARING.

1,102,547.  Specification of Letters Patent.  Patented July 7, 1914.

Application filed October 18, 1912. Serial No. 726,453.

*To all whom it may concern:*

Be it known that I, ALBERT F. ROCKWELL, a citizen of the United States, residing at Bristol, county of Hartford, State of Connecticut, have invented a certain new and useful Antifriction-Bearing, of which the following is a full, clear, and exact description, such as will enable others skilled in the art to which it appertains to make and use the same, reference being had to the accompanying drawings, forming part of this specification.

My invention relates to antifriction bearings.

In antifriction bearings as heretofore constructed, it has been usual to provide a manually operated and exposed means for adjusting the bearing to place the parts in proper working position. But with such bearings a fault has been that it has been difficult to always adjust the bearing properly. Furthermore, since the adjusting means is manually operable, it is liable to be tampered with and a proper adjustment destroyed. This is particularly the case in bearings, (such for example as bicycle hub bearings, magneto bearings and so forth) destined for general use by persons unfamiliar with mechanical devices.

An object of my invention is to provide a bearing which will always automatically maintain the rotating parts in proper adjustment.

Another object is to provide a bearing which will automatically compensate for wear.

Another object is to provide a means for antifrictionally holding a shaft or the like against endwise shifting and lateral play.

Another object is to provide a compensating bearing that automatically maintains proper adjustment and is not easily tampered with.

Another object is to provide a device of the character indicated which is simple, compact and inexpensive, and withal efficient and not likely to get out of order.

To these ends and also to improve generally upon devices of the character indicated my invention consists in the various matters hereinafter described and claimed.

In the accompanying drawings:—Figure 1 is a longitudinal sectional view showing the bearing applied to the shaft of a magneto; Fig. 2 is an enlarged view of the bearings; and Fig. 3 is a plan view of the adjusting spring.

Without restricting my invention thereto I have, in the accompanying drawings, illustrated a magneto shaft bearing in which my invention is embodied.

In the illustrated device the armature shaft 1 is carried by two spaced bearings 2 and 3 respectively whose cone members 4 and 5 respectively are fixed against sliding movement along the shaft. The open sided cup 6 of the bearing 2 is fixed against longitudinal movement. The corresponding and facing open sided cup 7 of the bearing 3 is longitudinally movable.

Between the movable cup 7 and the fixed abutment 8 is an annulus 9 of spring metal bearing tongues 10 which press against the member 7 and urge the same toward the cone 5. Thus, the member 7 being, as it is, urged toward the balls 11, presses the cone 5, the shaft 1, the cone 4, and the balls 12 toward the cup 6 whereby the shaft and its bearings are automatically always held in proper adjustment, and wear, etc., are automatically compensated for, manual adjustment being entirely eliminated. Thus in the illustrated embodiment of my invention there are provided a plurality of relatively rotatable parts such, for example, as the before referred to shaft 1 and the casing 13. Race members fixed against sliding movement along one of the relatively rotatable members, as the shaft 1, are also provided, being here shown as the spaced inner race members 4 and 5 of the antifriction bearings 2 and 3. And the race members coöperating with these fixed race members, and here shown as the open sided and facing outer race members 6 and 7, are so mounted as to be movable with respect to each other along the line of the member carrying the fixed race members and here illustrated as the shaft. The primarily movable member, as 7, is preferably so urged along the line of the member upon which are fixed the race members, as to maintain the parts in proper adjustment and working position.

Suitable means is provided for so influencing the movable race member such as a resilient abutment, presser, tension device, or compensator, here shown as the before referred to annulus 9 tending to force the movable race member 7 toward the corresponding race member 6. I find a spring of the form shown desirable since it is simple, efficient and inexpensive and can be easily fitted in the casing to be thereby protected from tampering and injury. As here shown the presser is conveniently received in the space 14 between the bearing 3 and the fixed abutment 8, here shown as a part of the casing 13.

I find highly desirable for convenience and satisfactory operation race members having races of a contour such as those of the members 6 and 7. In these illustrated race members the curve of the race is ground upon a considerably greater radius than that of the balls and is a continuous curve from the one edge to the other. This form of race furnishes an inclined plane transverse the member and along which the antifriction members, here illustrated as balls, travel easily.

As here shown, the outer member 6 of the bearing 2, is fixed against longitudinal movement by a fixed abutment which may, as shown, conveniently be a wall of the casing 13, while the shaft race members are conveniently held from sliding along the shaft 1 by the nut 15 and the shoulder 16, and the shoulder 17 and the nut 18.

It will be seen that I have provided a bearing whose parts are always maintained in proper working relation, which requires no manual adjustment, whose parts are well protected and which is simple, efficient and inexpensive.

Having thus described my invention, what I claim as new and desire to secure by Letters Patent is:—

In an antifriction bearing, the combination with an inner and an outer race member and antifriction members therebetween, one of such race members having an oblique race way, of an annulus of resilient material of substantially the diameter of the race member having the oblique race way and provided with tongues projecting from the body of said annulus, and a support adjacent but spaced from said race member, said annulus being received between said support and said race member with its tongues under compression therebetween and acting to force said race member toward the antifriction members; substantially as described.

In testimony whereof, I hereunto affix my signature, in the presence of two witnesses.

ALBERT F. ROCKWELL.

Witnesses:
 DE WITT PAGE,
 JOSEPH D. BROWN.